United States Patent [19]
Urano

[11] Patent Number: 5,923,544
[45] Date of Patent: Jul. 13, 1999

[54] NONCONTACT POWER TRANSMITTING APPARATUS

[75] Inventor: Takashi Urano, Chiba, Japan

[73] Assignee: TDK Corporation, Tokyo, Japan

[21] Appl. No.: 08/897,680

[22] Filed: Jul. 21, 1997

Related U.S. Application Data

[30] Foreign Application Priority Data

Jul. 26, 1996 [JP] Japan ..................................... 8-197483
Nov. 25, 1996 [JP] Japan ..................................... 8-313175

[51] Int. Cl.$^6$ .......................... H02M 3/335; H01M 10/44
[52] U.S. Cl. .............................. 363/22; 320/108; 307/104
[58] Field of Search ........................ 363/17, 22; 320/108; 340/870.31; 307/104

[56] References Cited

U.S. PATENT DOCUMENTS

| | | | |
|---|---|---|---|
| 5,428,521 | 6/1995 | Kigawa et al. | 363/22 |
| 5,461,299 | 10/1995 | Bruni | 320/108 |
| 5,463,303 | 10/1995 | Hall et al. | 320/108 |
| 5,536,979 | 7/1996 | McEachern et al. | 307/104 |
| 5,550,452 | 8/1996 | Shirai et al. | 320/108 |
| 5,600,225 | 2/1997 | Goto | 320/108 |
| 5,675,491 | 10/1997 | Kijima | 363/22 |
| 5,680,028 | 10/1997 | McEachern | 320/108 |

*Primary Examiner*—Stuart N. Hecker
*Attorney, Agent, or Firm*—Oblon, Spivak, McClelland, Maier & Neustadt, P.C.

[57] ABSTRACT

A noncontact power transmitting apparatus which makes it possible to rapidly charge a secondary cell of a part to be charged with large electric power and realize a lightweight and compact part to be charged. A power-transmitting coil of a charging part is divided into two sets, and the power-transmitting coils of the sets are respectively wound around cores, and are formed as a first power-transmitting coil portion 26 and a second power-transmitting coil portion 27 which are separate and independent as the two sets. Meanwhile, a power-receiving coil of a part to be charged is wound around a core, and is formed as a single power-receiving coil portion 28. In a chargeable state in which the part to be charged is placed on the charging part, the power-receiving coil portion 28 is inserted in a space between the first power-transmitting coil portion 26 and the second power-transmitting coil portion 27, and the first power-transmitting coil portion 26, the power-receiving coil portion 28, and the second power-transmitting coil portion 27 are arranged in such a manner as to be aligned with each other. Windings are wound such that the polarities of the windings are adjusted so that the directions of magnetic fluxes $\phi 1$ and $\phi 2$, which penetrate from the first power-transmitting coil portion 26 and the second power-transmitting coil portion 27 through the power-receiving coil portion 28, are constantly set in the same direction.

10 Claims, 12 Drawing Sheets

NONCONTACT POWER TRANSMITTING APPARATUS

BACKGROUND OF THE INVENTION

The present invention relates to a noncontact power transmitting apparatus which can be used for portable communication equipment, such as a portable telephone and a PHS (personal handyphone system) telephone, various electrical apparatuses, electronic apparatuses, or the like which operate by using a rechargeable secondary battery as a power source. More particularly, the present invention concerns a noncontact power transmitting apparatus for transmitting electric power from a charging part to a part to be charged in a state of noncontact by means of the action of electromagnetic induction without via a metal contact.

Hereafter, a description will be given of a conventional device with reference to the drawings.

FIGS. 12A to 12C are explanatory diagrams illustrating a conventional charging device. FIG. 12A is a circuit diagram, FIG. 12B is a schematic diagram of coils, and FIG. 12C shows a B-H loop of a core. Hereafter, a description will be given of the conventional charging device with reference to FIGS. 12A to 12C. As an example of a noncontact power transmitting apparatus, an example of a dc power source apparatus disclosed in, for example, in Japanese Patent Publication JP 7-46841 is conventionally known. This apparatus is capable of realizing satisfactory regulation in a relatively wide output range, and has a circuit shown in FIGS. 12A to 12C, for instance. Hereafter, a description will be given of the operation of the circuit shown in FIGS. 12A to 12C.

A gate voltage of a field-effect transistor 7 is provided by the voltage which is charged in a first capacitor 2 from an output of a rectifying and smoothing circuit 1 through a first resistor 3. When the field-effect transistor 7 is turned on by the aforementioned voltage, a voltage is generated in a main winding 9 and a gate winding 10 of a primary transformer 8 in such a way that the sides marked with black dots become plus, so that the on-state of the field-effect transistor 7 is established.

Here, when the field-effect transistor 7 is turned on, because the electrical charge at the first capacitor 2 is discharged through a second resistor 4 and a first diode 5, the voltage at the first capacitor 2 declines and the field-effect transistor 7 is turned off after a certain time elapsed. When the field-effect transistor 7 is turned off, the first capacitor 2 is charged through the resistor 3, and when the voltage at the first capacitor 2 reaches a predetermined value, the field-effect transistor 7 is turned on. Thus, a primary circuit undergoes self-oscillation.

At this time, in the primary circuit, electric power is transmitted from the primary transformer 8 (power-transmitting coil portion), and this power is received by a secondary transformer 11 (power-receiving coil portion) of a secondary circuit. Then, current flows across a fourth capacitor 14 by the voltage induced in the secondary transformer 11, and the voltage is generated in the secondary circuit. The current is rectified by this voltage through a diode 12, and a capacitor 13 is charged to generate a dc voltage.

The primary transformer 8 (power-transmitting coil portion) and the secondary transformer 11 (power-receiving coil portion) are used in the relationship such as shown in FIG. 12B. In the above-described circuit, since the primary transformer 8 is driven by a single field-effect transistor 7 as the above-described manner, the magnetic flux of the core of the primary transformer 8 and the secondary transformer 11 is oscillated only in the first quadrant as shown by a B-H loop (B: magnetic flux density, H: magnetic field strength) in FIG. 12C. That is, the magnetic flux acts only on one upper or lower side of the B-H loop.

With the above-described conventional noncontact power transmitting apparatus, the following problems are encountered.

With the above-described conventional apparatus, the magnetic flux of the core of the primary transformer 8 (power-transmitting coil portion) and the secondary transformer 11 (power-receiving coil portion) is oscillated only in the first quadrant as shown by the B-H loop in FIG. 12C, and the magnetic flux acts only on one upper or lower side of the B-H loop. Accordingly, the efficiency in the noncontact power transmission is poor, so that in order to produce large power from the secondary transformer 11 (power-receiving coil portion), it is necessary to make the secondary transformer 11 large-sized, and the weight becomes heavy.

Further, with the above-described conventional apparatus, the magnetic path of the primary transformer 8 (power-transmitting coil portion) and the secondary transformer 11 (power-receiving coil portion) is configured such that the leakage flux is large, and effective use is not made of the magnetic flux generated by the primary transformer 8 (power-transmitting coil portion). For this reason, in order to produce large power (e.g., 5 W or more) from the secondary transformer 11 (power-receiving coil portion) so as to rapidly charge a large-capacity secondary battery, such as a lithium ion secondary battery, the secondary transformer 11 (power-receiving coil portion) becomes large-sized, and the weight becomes heavy.

In a case where the above-described conventional apparatus is used for a portable telephone, for example, the secondary transformer 11 (power-receiving coil portion) must be incorporated on portable telephone body side, while the primary transformer 8 (power-transmitting coil portion) must be incorporated on the charger side. Therefore, if the secondary transformer 11 (power-receiving coil portion) is large-sized and the weight is heavy as described above, the portable telephone body (handset), which needs to be always carried by a user, becomes large-sized and heavy, which is inconvenient.

SUMMARY OF THE INVENTION

The object of the present invention is to provide a noncontact power transmitting apparatus which comprises a charging part and a part to be charged, makes it possible to realize a lightweight and compact part to be charged, and allows a secondary battery to be charged rapidly with large electric power, thereby overcoming the above-described drawbacks of the conventional art.

In accordance with the present invention, to attain the above object, the following configurations are provided.

There is provided a noncontact power transmitting apparatus in which a power transmitting part (e.g. a charger) and a power receiving part (e.g., a portable telephone body) are formed separately, the power transmitting part is provided with a high-frequency oscillating circuit including a parallel resonance circuit formed by a power-transmitting coil and a capacitor, and the power receiving part is provided with a power-receiving coil for inducing a voltage by electromagnetically coupling with the power-transmitting coil of the high-frequency oscillating circuit during power transmitting. The power-transmitting coil is divided into two sets, the power-transmitting coils of the sets being formed as a first power-transmitting coil portion and a second power-transmitting coil portion which are separate and independent as the two sets, the power-receiving coil being formed as a single power-receiving coil portion. In a power transmitting state in which the power receiving part is magnetically coupled with the power transmitting part, the power-receiving coil portion is inserted in a space between the first power-transmitting coil portion and the second power-transmitting coil portion, and the first power-transmitting coil portion, the power-receiving coil portion, and the second power-transmitting coil portion are arranged in such a manner that the power-receiving coil portion is located in the magnetic flux generated by the first and second power-transmitting coil portions.

Further, in the above-mentioned noncontact power transmitting apparatus, the power-transmitting coil is divided into two sets, the power-transmitting coils of the sets being respectively wound around cores (e.g., ferrite cores) and being formed as a first power-transmitting coil portion and a second power-transmitting coil portion which are separate and independent as the two sets, the power-receiving coil being wound around a core (e.g., a ferrite core) and being formed as a single power-receiving coil portion.

Furthermore, in the above-described noncontact power transmitting apparatus, the power-transmitting coil of the first power-transmitting coil portion and the power-transmitting coil of the second power-transmitting coil portion are connected in series or in parallel, and respectively consist of two winding portions, and the winding portions of the power-transmitting coils are wound such that polarities of the winding portions are adjusted so that directions of magnetic fluxes, which penetrate from the first power-transmitting coil portion and the second power-transmitting coil portion through the power-receiving coil portion, are always set in the same direction.

Furthermore, in the above-described noncontact power transmitting apparatus, the high-frequency oscillating circuit is provided with driving means for driving winding portions of the first power-transmitting coil portion and the second power-transmitting coil portion while alternately repeating a first timing at which one winding portion of the first power-transmitting coil portion and one winding portion of the second power-transmitting coil portion are energized simultaneously and other winding portions are not energized and a second timing at which another winding portion of the first power-transmitting coil portion and another winding portion of the second power-transmitting coil portion are energized simultaneously and the one winding portions are not energized.

Furthermore, in the above-described noncontact power transmitting apparatus, the power-transmitting coil of the first power-transmitting coil portion and the power-transmitting coil of the second power-transmitting coil portion are connected in series or in parallel, and respectively consist of one winding portions (single windings), and the winding portions of the power-transmitting coils are wound such that polarities of the winding portions are adjusted so that directions of magnetic fluxes, which penetrate from the first power-transmitting coil portion and the second power-transmitting coil portion through the power-receiving coil portion, are constantly set in the same direction.

DETAILED DESCRIPTION OF THE PREFERRED EMBODIMENTS

Figure 1A:
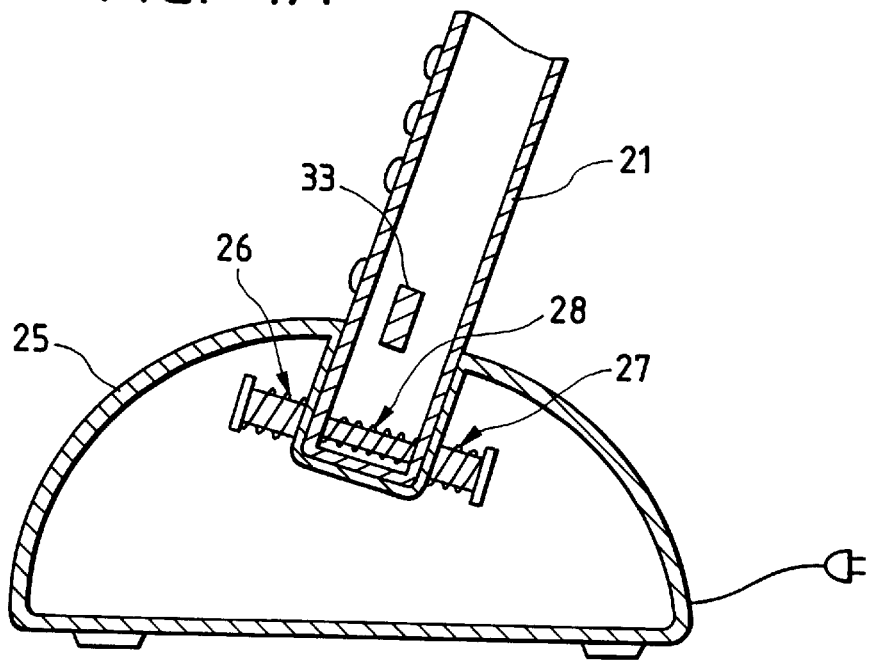
FIGS. 1A and 1B are explanatory diagrams of the basic principle of the present invention.
Figure 1B:
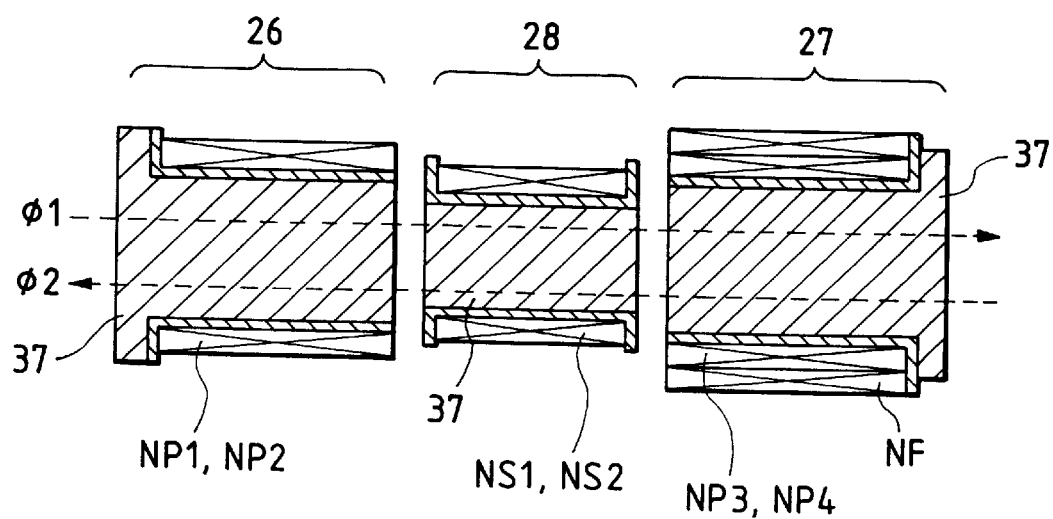

Referring to FIG. 1, a description will be given of the operation in accordance with the present invention based on the above-described configurations.

In a case where the secondary battery in the part to be charged is charged, a power plug is inserted into a power source, and the part to be charged is placed on the charging part. In this state, the power-receiving coil portion 28 in the part to be charged is inserted into the space between the first power-transmitting coil portion 26 and the second power-transmitting coil portion 27 in the charging part, and the power-transmitting coil portion 26, the power-receiving coil portion 28, and the second power-transmitting coil portion 27 are aligned with each other, and are set in a charging state.

In this case, the driving means drives the winding portions of the first power-transmitting coil portion 26 and the second power-transmitting coil portion 27 while alternately repeating the first timing at which one winding portion NP1 of the first power-transmitting coil portion 26 and one winding portion NP3 of the second power-transmitting coil portion 27 are energized simultaneously and the other winding portions NP2 and NP4 are not energized and a second timing at which another winding portion NP2 of the first power-transmitting coil portion 26 and another winding portion NP4 of the second power-transmitting coil portion 27 are energized simultaneously and the one winding portions NP1 and NP3 are not energized.

In this state, the secondary battery (e.g., the Li-ion secondary battery 33) is charged by the noncontact power transmission. Namely, the secondary battery is charged by transmitting electric power from the charging part to the part to be charged in a state of noncontact without via a metal contact by means of the action of electromagnetic induction. At this time, the directions of ac magnetic fluxes $\phi 1$ and $\phi 2$ which penetrate from the first power-transmitting coil portion 26 and the second power-transmitting coil portion 27 through the power-receiving coil portion 28 are always set in the same direction.

Thus, the power-receiving coil portion 28 at its both sides is placed between the two separate and independent first power-transmitting coil portion 26 and second power-transmitting coil portion 27, and the windings of the first and second power-transmitting coil portions 26 and 27 are driven by the high-frequency oscillating circuit. As a result of this driving, the change in the magnetic flux of the ferrite core 37 is subjected to large oscillations in the first and third quadrants of the B-H loop, thereby making it possible to realize the noncontact power transmission with high efficiency. In the above-described manner, it is possible to realize a lightweight and compact part to be charged and rapidly charge the secondary battery with large power.

Hereafter, a detailed description will be given of an embodiment of the present invention with reference to the drawings. In the description that follows, a description will be given of an example in which the noncontact power transmitting apparatus is applied to a portable telephone (including a PHS). It should be noted that, in this example, the portable telephone is comprised of a portable telephone body and a charger, the portable telephone body being also referred to as a part to be charged and the charger as a charging part. In addition, the term "one winding," "a single winding," or "one winding portion" means one coil in which a winding start portion and a winding end portion are formed as a pair.

Figure 2A:
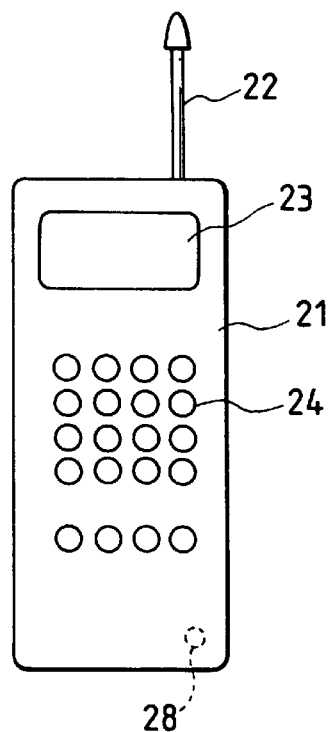
FIGS. 2A and 2B are schematic diagrams of a portable telephone in accordance with the present invention.
Figure 2B:
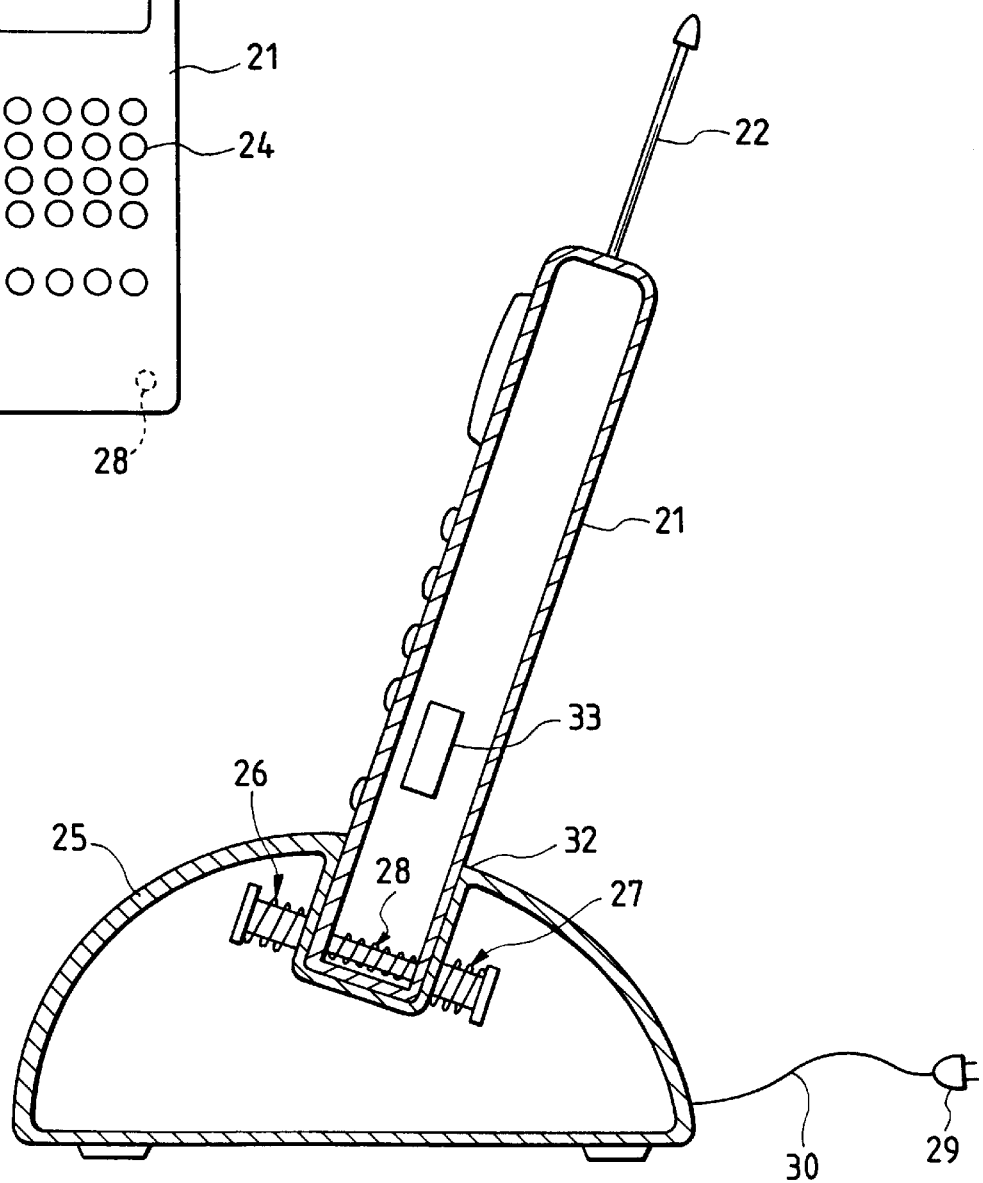

FIGS. 2A and 2B are schematic diagrams of a portable telephone. FIG. 2A is a plan view and FIG. 2B is a cross-sectional view. As shown, the portable telephone is comprised of a portable telephone body 21 (handset) and a charger 25. The portable telephone body 21 is provided with an antenna, a display unit 23, an operating portion 24, and the like. Provided in its housing interior are an Li-ion secondary battery 33 as a power source of the portable telephone body 21, and a circuit of the part to be charged including a power-receiving coil portion 28 for charging the Li-ion secondary battery.

Meanwhile, a power cord 30 provided with a power plug 29 is connected to the charger 25 so as to allow power (commercial power supply) to be supplied from the outside. A circuit of the charging part, which includes a first power-transmitting coil portion 26 and a second power-transmitting coil portion 27 for charging the Li-ion secondary battery 33 by noncontact power transmission, is provided in a housing of the charger 25.

In addition, a recessed portion 32 is provided in a portion of the housing of the charger 25 so as to allow a lower portion of the portable telephone body 21 to be inserted in this recessed port ion 32. In this case, the first power-transmitting coil portion 26 and the second power-transmitting coil portion 27 are juxtaposed and arranged such that the power-receiving coil portion 28 in the portable telephone body 21 can be inserted in the space between the two coil portions.

In a case where the Li-ion secondary battery in the portable telephone body 21 is charged, the power plug 29 is inserted into the commercial power source (e.g., AC 100 V), and the lower side of the portable telephone body 21 is inserted into the recessed portion 32 of the charger 25. Positioning is effected in advance such that, in this state, the power-receiving coil portion 28 in the portable telephone body 21 is inserted in the space between the first power-transmitting coil portion 26 and the second power-transmitting coil portion 27 in the charger 25, and the first power-transmitting coil portion 26, the power-receiving coil portion 28, and the second power-transmitting coil portion 27 are aligned with each other.

In this state, the Li-ion secondary battery 33 is charged by the noncontact power transmission. Namely, the Li-ion secondary battery 33 is charged by transmitting electric power from the charging part to the part to be charged in a state of noncontact without via a metal contact by means of the action of electromagnetic induction. In a case where the portable telephone body 21 is to be used by being carried, it suffices if the portable telephone body 21 is removed from the charger 25 and is carried.

Figure 3:
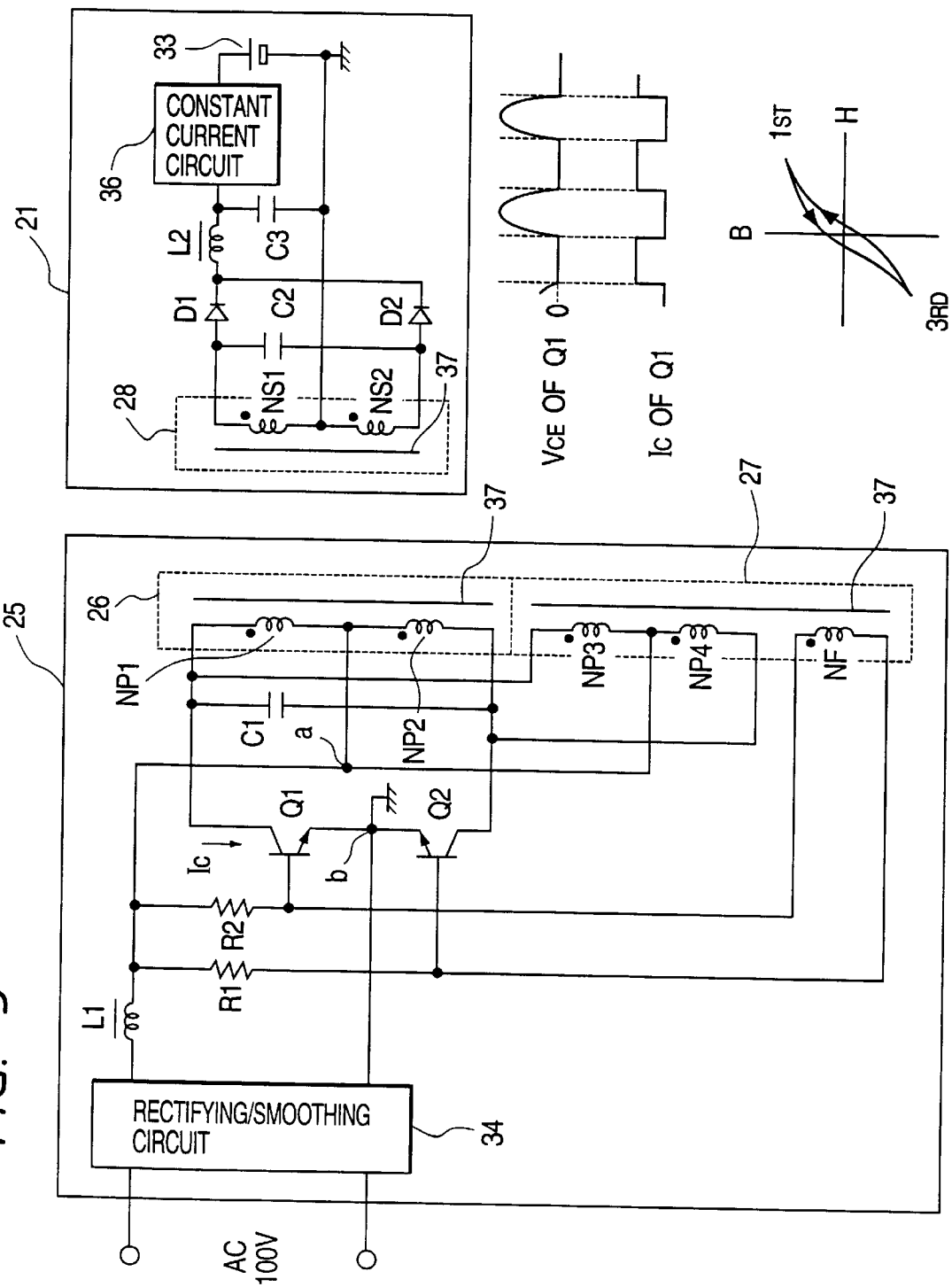
FIG. 3 is a diagram illustrating a circuit diagram in accordance with the first embodiment.

FIG. 3 shows a circuit diagram of a first embodiment. Referring now to FIG. 3, a description will be given of the configuration of the circuit. The circuit as shown in FIG. 3 is a circuit of the portable telephone body 21 (part to be charged) and the charger 25 (charging part). The charging part 2 is a circuit whereby high-frequency electromagnetic waves are generated by driving the first power-transmitting coil portion 26 and the second power-transmitting coil portion 27 by a high-frequency oscillating circuit of a push-pull type using two bipolar transistors Q1 and Q2, so as to effect the noncontact power transmission to the part to be charged by means of the electromagnetic waves.

The charging part is provided with a rectifying and smoothing circuit 34, a choke coil L1 for a constant current, the transistors Q1 and Q2 whose emitters are grounded, resistors R1 and R2 for starting, a capacitor C1 for parallel resonance, the first power-transmitting coil portion 26, and the second power-transmitting coil portion 27. The first power-transmitting coil portion 26 is constituted by a ferrite core 37 and a first power-transmitting coil including two windings NP1 and NP2 which are wound around the ferrite core 37 and are connected in series.

The second power-transmitting coil portion 27 is constituted by a ferrite core 37, a second power-transmitting coil including two windings NP3 and NP4 which are wound around the ferrite core 37 and are connected in series, and a winding NF for feedback. The windings NP1 and NP3 are connected in parallel, the windings NP2 and NP4 are connected in parallel, and these windings are respectively connected to the power source and the collectors of the transistors Q1 and Q2.

In this case, the winding NF for feedback which is wound around the ferrite core 37 of the second power-transmitting coil portion 27 is connected to the respective bases of the transistors Q1 and Q2. The first power-transmitting coil including the windings NP1 and NP2, the second power-transmitting coil including the windings NP3 and NP4, and the capacitor C1 are connected in parallel, and constitute a parallel resonance circuit.

Meanwhile, the part to be charged is provided with the power-receiving coil portion 28, a capacitor C2 for parallel resonance, diodes D1 and D2 for full-wave rectification, a choke coil L2, a capacitor C3 for smoothing, a constant-current circuit 36, and the Li-ion secondary battery 33. The power-receiving coil portion 28 is constituted by the ferrite core 37 and two windings NS1 and NS2 which are wound around the ferrite core 37 and are connected in series. In this case, the windings NS1 and NS2 constitute a power-receiving coil, and the capacitor C2 is connected in parallel with the power-receiving coil, thereby constituting a parallel resonance circuit.

Referring now to FIG. 3, a description will be given of the operation of the circuit. In the circuit shown in FIG. 3, the power-receiving coil portion 28 at its both sides is placed between the two separate and independent first power-transmitting coil portion 26 and second power-transmitting coil portion 27 (see FIG. 2), and the windings of the first and second power-transmitting coil portions 26 and 27 are driven by the high-frequency oscillating circuit of the push-pull type. As a result of this driving, the change in the magnetic flux of the ferrite core 37 is subjected to large oscillations in the first and third quadrants of the B-H loop, thereby realizing the noncontact power transmission with high efficiency.

In the charging part, the self-oscillation of high-frequency waves is started at a resonance frequency $f_0 = \frac{1}{2}\pi\sqrt{L_P \times C1}$ which is determined by an exciting impedance $L_P$ of the windings of the power-transmitting coil connected in parallel with the capacitor C1 and the capacitance of the capacitor C1 for parallel resonance (the electrostatic capacity of the capacitor C1 being also set as C1), and the transistors Q1 and Q2 alternately repeat on/off operation. In this case, the detailed operation of each part is as follows.

First, on application of electric power to the charging part from the AC power source (e.g., AC 100 V), the rectifying and smoothing circuit 34 effects rectification and smoothing to generate a dc voltage, and the current is converted to a constant current by the choke coil L1. Then, as the base current flows across the transistors Q1 and Q2 via the resistors R1 and R2, the transistors Q1 and Q2 operate as described above, thereby effecting the high-frequency oscillating operation.

In this operation, in a case where the transistor Q1 is on and the transistor Q2 is off, the current flows through a path which is comprised of the power source→L1→point a→NP1 and NP3→the collector of Q1→the emitter of Q1→point b (GND), and a collector current $I_C$ thus flows across the transistor Q1. At this time, no current flows across the windings NP2 and NP4.

Meanwhile, in a case where the transistor Q1 is off and the transistor Q2 is on, the current flows through a path which is comprised of the power source→L1→the point a→NP2 and NP4→the collector of Q2→the emitter of Q2→the point b (GND), and the collector current $I_C$ thus flows across the transistor Q2. At this time, no current flows across the windings NP1 and NP3.

In addition, as current flows across the first power-transmitting coil constituted by the windings NP1 and NP2 and the second power-transmitting coil constituted by the windings NP3 and NP4, a voltage is induced in the feedback winding NF as well. As positive feedback is provided to the bases of the transistors Q1 and Q2 by this voltage, the oscillating operation is continued.

The transistors Q1 and Q2 effect the push-pull operation in the above-described manner, and drive the first and second power-transmitting coils. In this case, the collector-emitter voltage VCE of the transistor Q1 and the collector current $I_C$ of the transistor Q1 assume the illustrated waveforms. In addition, the collector-emitter voltage VCE of the transistor Q2 and the collector current $I_C$ of the transistor Q2 also assume similar waveforms, but their phases are offset from each other.

On the other hand, the part to be charged operates as follows. As the charging part undergoes the high-frequency oscillating operation in the above-described manner, the transmission of power is effected by electromagnetic coupling. At this time, by the action of electromagnetic induction, a voltage is induced in the windings NS1 and NS2 constituting the power-receiving coil portion 28 of the part to be charged. As a result of this induced voltage, current flows across the parallel resonance circuit constituted by the windings NS1 and NS2 and the capacitor C2, so that the parallel resonance circuit assumes a state of parallel resonance, expanding the amplitude of voltage.

Then, the output of the parallel resonance circuit is subjected to full-wave rectification by a full-wave rectification circuit constituted by the diodes D1 and D2, and the ripple current is reduced by a smoothing circuit constituted by the choke coil L2 and the capacitor C3, thereby generating a smooth dc voltage. Then, the constant-current circuit 36 is operated by the dc voltage to generate a constant current, and the Li-ion secondary battery 33 is charged by this constant current.

The Li-ion secondary battery 33 is charged as the noncontact power transmission is effected from the charging part to the part to be charged by the above-described operation. In this case, the magnetic flux of the ferrite core 37 is subjected to large oscillations between the positive and negative sides in the first and third quadrants of the B-H loop in the illustrated manner. It should be noted that the present invention can be also implemented if the ferrite core 37 is omitted, and all the first power-transmitting coil portion 26, the second power-transmitting coil portion 27, and the power-receiving coil portion 28 are formed as air-core coils.

Figure 4:
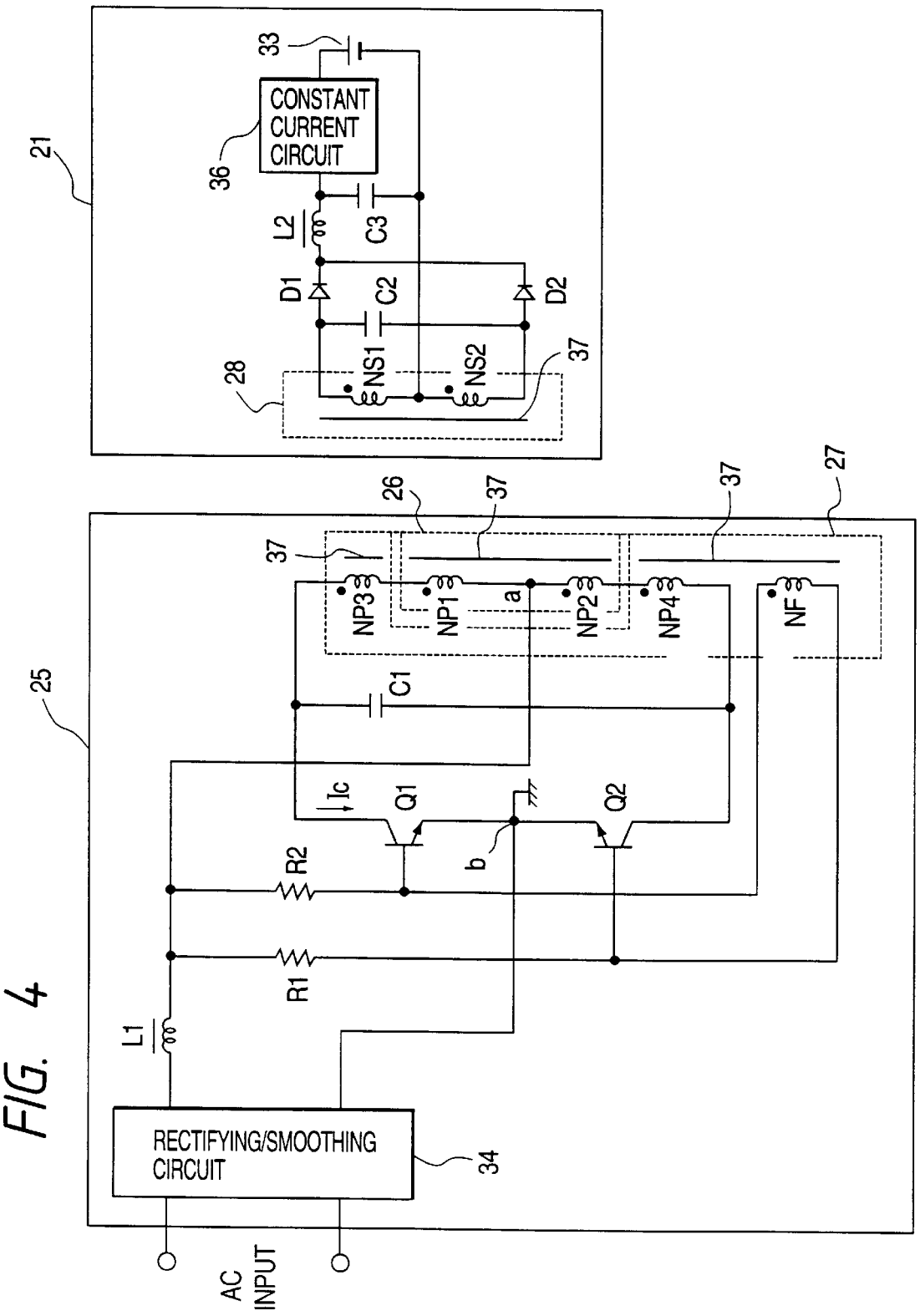
FIG. 4 is a diagram illustrating a circuit diagram in accordance with the second embodiment.

Referring now to FIG. 4, a description will be given of the circuit configuration and operation of a circuit according to the second embodiment. The circuit shown in FIG. 4 is an example in which all the windings of the first power-transmitting coil portion 26 and the second power-transmitting coil portion 27 are connected in series. In this circuit as well, the power-receiving coil portion 28 at its both sides is placed between the two separate and independent first power-transmitting coil portion 26 and second power-transmitting coil portion 27 (see FIG. 2), and the windings of these power-transmitting coil portions are driven by a high-frequency oscillating circuit of the push-pull type of the circuit as shown in FIG. 4.

As a result of this driving, the change in the magnetic flux of the ferrite core 37 is subjected to large oscillations in the first and third quadrants of the B-H loop, thereby realizing the noncontact power transmission with high efficiency. A specific circuit configuration is provided as follows. In the charging part, all of the windings NP1 and NP2 of the first power-transmitting coil portion 26 and the windings NP3 and NP4 of the second power-transmitting coil portion 27 are connected in series in order of NP3, NP1, NP2, and NP4 between the collector of the transistor Q1 and the collector of the transistor Q2.

Further, the point of contact a between the windings NP1 and NP2 is connected to the power source via the choke coil L1, and one end of the winding NP3 is connected to the collector of the transistor Q1, while one end of the winding NP4 is connected to the collector of the transistor Q2. The windings NP1 to NP4 and the capacitor C1 are connected in parallel, and constitute the parallel resonance circuit. It should be noted that the other arrangements are similar to those of the above-described first embodiment.

The operation of the circuit shown in FIG. 4 is as follows. As the transistors Q1 and Q2 undergo the push-pull operation in the same way as in the circuit of the first embodiment to effect the high-frequency oscillating operation, thereby driving the windings NP1 to NP4. The current which flows across various parts is as follows.

In a case where the transistor Q1 is on and the transistor Q2 is off, the current flows through a path which is comprised of the power source→L1→the point a→NP1→NP3→the collector of Q1→the emitter of Q1→the point b (GND), and the collector current $I_C$ thus flows across the transistor Q1. Meanwhile, in a case where the transistor Q1 is off and the transistor Q2 is on, the current flows through a path which is comprised of the power source→L1→the point a→NP2→NP4→the collector of Q2→the emitter of Q2→the point b (GND), and the collector current $I_C$ thus flows across the transistor Q2. Incidentally, the other operation is similar to that of the above-described circuit of the first embodiment.

In this circuit of the second embodiment, the way in which the magnetic flux is oscillated in the ferrite core 37 is similar to the case of the circuit of the first embodiment, but since all the windings of the power-transmitting coils are connected in series, it is readily possible to increase the inductance of the power-transmitting coils. For this reason, in a case where the input voltage is high (e.g., AC 200 V), it is possible to prevent the exciting current from becoming excessively large. It should be noted that the present invention can be also implemented if the ferrite core 37 is omitted, and all the first power-transmitting coil portion 26, the second power-transmitting coil portion 27, and the power-receiving coil portion 28 are formed as air-core coils.

Figure 5A:
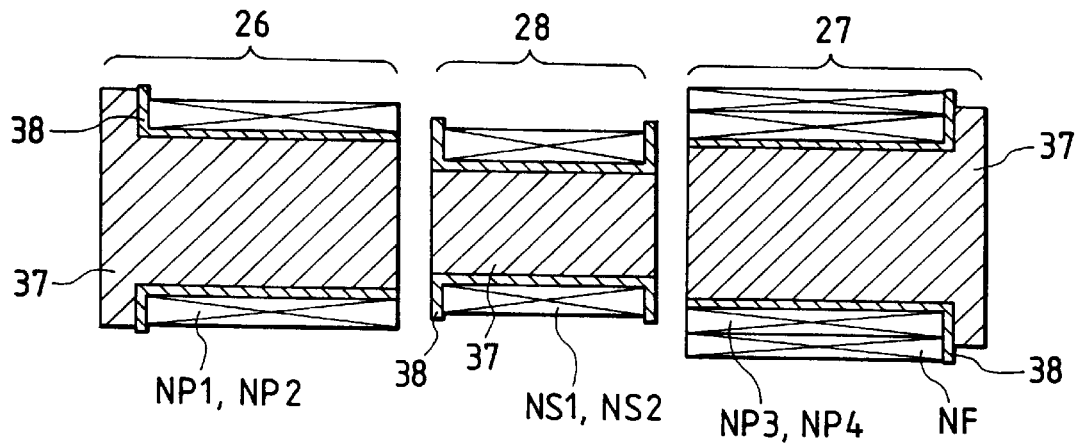
FIGS. 5A to 5C are explanatory diagrams of power-transmitting coil portions and a power-receiving coil portion.
Figure 5B:
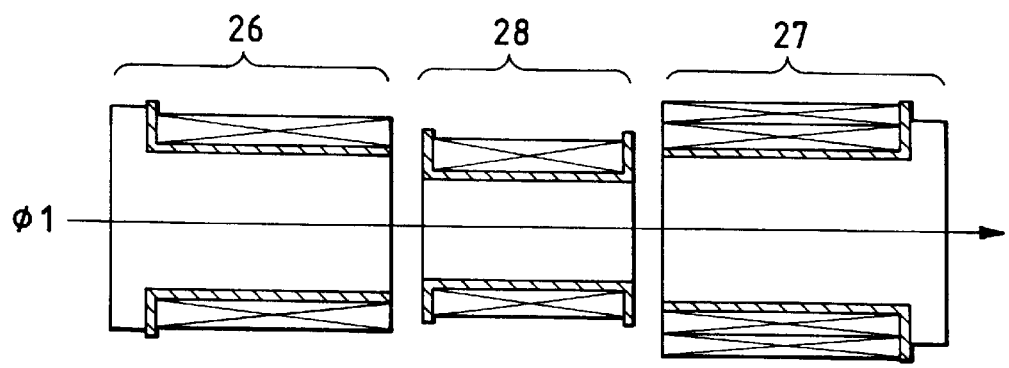
Figure 5C:
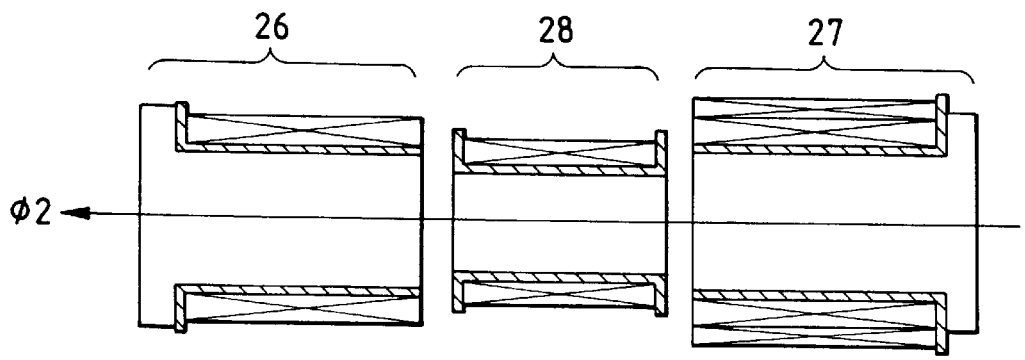

FIGS. 5A to 5C are explanatory diagrams of the power-transmitting coil portions and the power-receiving coil portion. FIG. 5A is an explanatory diagram of layout, and FIGS. 5B and 5C are explanatory diagrams of the magnetic flux. As described before, in the charging part in each of the circuit according to the first and second embodiments, the power-transmitting coil is divided into two sets, and the power-transmitting coils of the sets (the first power-transmitting coil and the second power-transmitting coil) are respectively wound around the ferrite cores 37, and are formed as the first power-transmitting coil portion 26 and the second power-transmitting coil portion 27 which are separate and independent as the two sets. In addition, the power-receiving coil provided in the part to be charged is wound around the ferrite core 37, and is formed as the single power-receiving coil portion 28.

Then, in a chargeable state in which the part to be charged is placed on the charging part, the power-receiving coil portion 28 is inserted in the space between the first power-transmitting coil portion 26 and the second power-transmitting coil portion 27, so that the first power-transmitting coil portion 26, the power-receiving coil portion 28, and the second power-transmitting coil portion 27 are arranged as to be aligned with each other, as shown in FIG. 5A.

In addition, the power-transmitting coil of the first power-transmitting coil portion 26 is arranged such that an insulator base 38 is provided around the ferrite core 37, and the power-transmitting coil of the first power-transmitting coil portion 26 is constituted by the two windings NP1 and NP2 which are wound therearound and are connected in series. Meanwhile, the power-transmitting coil of the second power-transmitting coil portion 27 is arranged such that an insulator base 38 is provided around the ferrite core 37, and the power-transmitting coil of the second power-transmitting coil portion 27 is constituted by the two windings NP3 and NP4 which are wound therearound and are connected in series. Incidentally, the second power-transmitting coil portion 27 is also provided with the winding NF for feedback which is wound around the ferrite core 37.

Further, the power-receiving coil of the power-receiving coil portion 28 is arranged such that an insulator base 38 is provided around the ferrite core 37, and the power-receiving coil of the power-receiving coil portion 28 is constituted by the windings NS1 and NS2 which are wound therearound. As shown in FIG. 5B, the respective windings of the above-described power-transmitting coils are wound such that the polarities of the windings NP1, NP2, NP3, and NP4 are adjusted so that the directions of ac magnetic fluxes φ1 and φ2, which penetrate from the first power-transmitting coil portion 26 and the second power-transmitting coil portion 27 through the power-receiving coil portion 28 with the Li-ion secondary battery 33 charged, are constantly set in the same direction.

For example, if the direction of the magnetic flux generated in the first power-transmitting coil portion 26 is the direction of φ1, the direction of the magnetic flux generated in the second power-transmitting coil portion 27 at this time is also the direction of φ1, and the direction of the magnetic flux generated in the power-receiving coil portion 28 is also the direction of φ1. On the other hand, if the direction of the magnetic flux generated in the first power-transmitting coil portion 26 is the direction of φ2 (an opposite direction to φ1), the direction of the magnetic flux generated in the second power-transmitting coil portion 27 at this time is also the direction of φ2, and the direction of the magnetic flux generated in the power-receiving coil portion 28 is also the direction of φ2.

Figure 6:
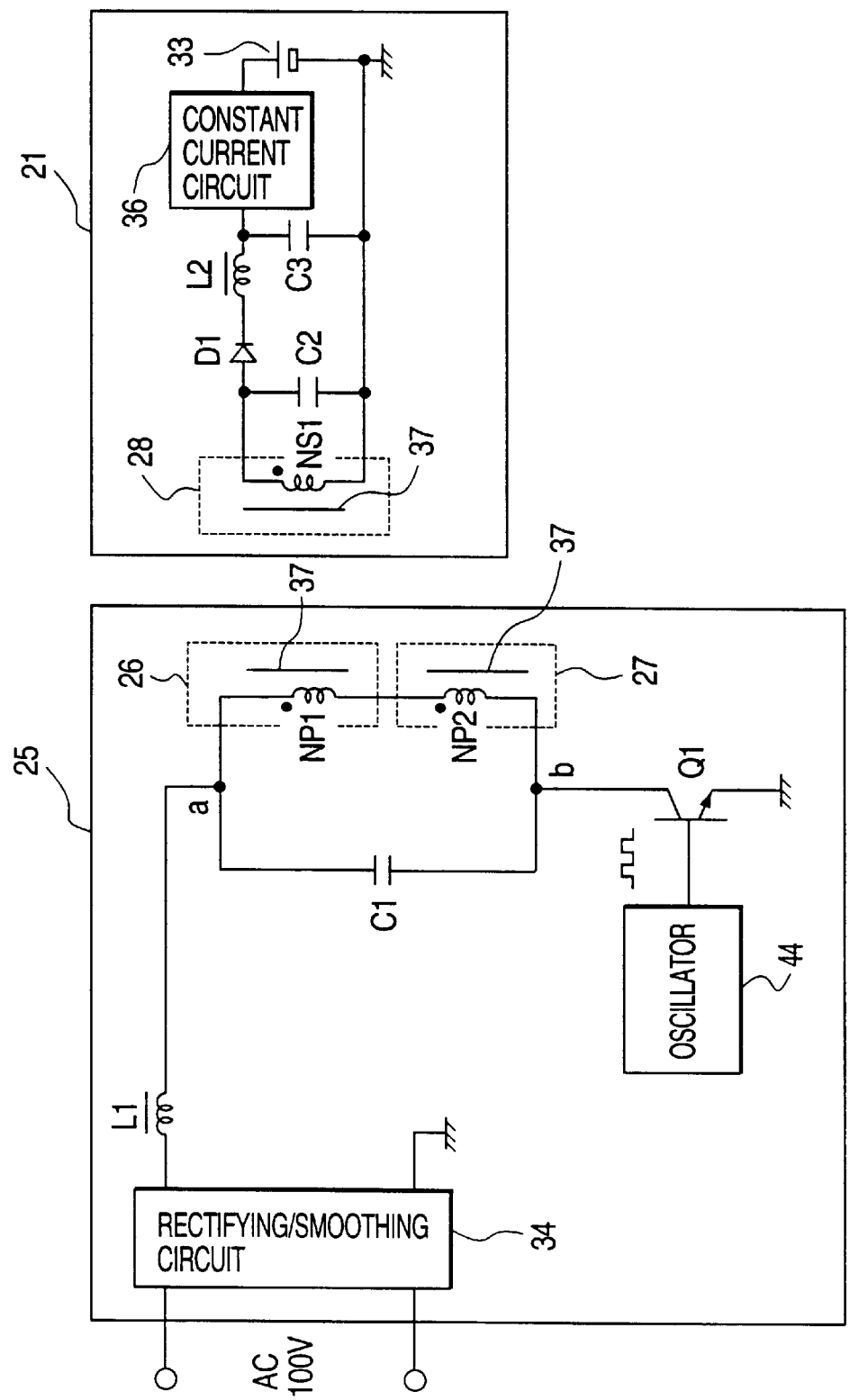
FIG. 6 is a diagram illustrating a circuit diagram in accordance with the third embodiment.

FIG. 6 shows a circuit according to third embodiment. Referring now to FIG. 6, a description will be given of the circuit of the third embodiment. The circuit of the third embodiment is an example in which each of the power-transmitting coils of the first power-transmitting coil portion 26 and the second power-transmitting coil portion 27 in the above-described circuit of the first and second embodiments is constituted by a single winding (one winding portion), these power-transmitting coils are connected in series. The power-receiving coil of the power-receiving coil portion 28 is also constituted by a single winding (one winding portion), and the high-frequency oscillating circuit of the charging part is formed as a high-frequency oscillating circuit of a separately excited type. Hereafter, the circuit of the third embodiment will be described in detail.

As shown in FIG. 6, the charging part is provided with the rectifying and smoothing circuit 34, the choke coil L1 for a constant current, the transistor Q1 whose emitter is grounded, an oscillator 44 for driving the transistor Q1, the capacitor C1 for parallel resonance, the first power-transmitting coil portion 26, and the second power-transmitting coil portion 27. The first power-transmitting coil portion 26 is constituted by the ferrite core 37 and the first power-transmitting coil constituted by the winding NP1 which is wound around the ferrite core 37.

Further, the second power-transmitting coil portion 27 is constituted by the ferrite core 37 and the second power-transmitting coil constituted by the winding NP2 which is wound around the ferrite core 37. The windings NP1 and NP2 are connected in series, and their both ends are connected to the power source and the collector of the transistor Q1. In addition, the series circuit of the windings NP1 and NP2 and the capacitor C1 are connected in parallel, and constitute a parallel resonance circuit.

When power is supplied to the oscillator 44 from an arbitrary power source (e.g., an output of the rectifying and smoothing circuit 34), the oscillator 44 undergoes oscillating operation, and imparts an oscillation output (e.g., a pulse signal) to the transistor Q1 as a drive signal, and the transistor Q1 is driven on and off by the drive signal.

The configuration provided is such that high-frequency electromagnetic waves are generated as the first power-transmitting coil portion 26 and the second power-transmitting coil portion 27 are driven by the parallel resonance circuit and the high-frequency oscillating circuit of the separately excited type using the transistor Q1, so as to effect the noncontact power transmission to the part to be charged by means of the electromagnetic waves.

Meanwhile, the part to be charged is provided with the power-receiving coil portion 28, the capacitor C2 for parallel resonance, the diode D1 for rectification, the choke coil L2, the capacitor C3 for smoothing, the constant-current circuit 36, and the Li-ion secondary battery 33. In this case, the power-receiving coil portion 28 is constituted by the ferrite core 37 and the winding NS1 which is wound around the ferrite core 37. In addition, the capacitor C2 is connected in parallel with the winding NS1, thereby constituting a parallel resonance circuit.

The operation of the circuit of the third embodiment is as follows. In the charging part, when power is supplied from the power source to the oscillator 44 to cause the oscillator 44 to start oscillating operation, and a drive signal is outputted from the oscillator 44 to the base of the transistor Q1, the transistor Q1 is driven on and off. Then, as the transistor Q1 is driven on and off, current flows across the parallel resonance circuit, and the parallel resonance circuit is set in a state of parallel resonance. In the charging part, the high-frequency oscillating circuit of the separately excited type thus effects the high-frequency oscillating operation. Then, as the first power-transmitting coil portion 26 and the second power-transmitting coil portion 27 are driven, high-frequency electromagnetic waves are generated, so as to effect the noncontact power transmission to the part to be charged by means of the electromagnetic waves.

Meanwhile, the part to be charged operates as follows. As the charging part undergoes the high-frequency oscillating operation in the above-described manner, the transmission of power is effected by electromagnetic waves. At this time, by the action of electromagnetic induction, a voltage is induced in the winding NS1 constituting the power-receiving coil portion 28 of the part to be charged. As a result of this induced voltage, current flows across the parallel resonance circuit constituted by the winding NS1 and the capacitor C2, so that the parallel resonance circuit assumes the state of parallel resonance, expanding the amplitude of voltage.

Then, the output of the parallel resonance circuit is subjected to half-wave rectification by the diode D1, and the ripple current is reduced by the choke coil L2 and a smoothing circuit constituted by the capacitor C3, thereby generating a smooth dc voltage. Then, the constant-current circuit 36 is operated by the dc voltage to generate a constant current, and the Li-ion secondary battery 33 is charged by this constant current. As the noncontact power transmission is effected from the charging part to the part to be charged by the above-described operation, the Li-ion secondary battery 33 is charged.

Thus, in the circuit of the third embodiment, since the number of the windings of each of the coils of the first power-transmitting coil portion 26, the second power-transmitting coil portion 27, and the power-receiving coil portion 28 is small as compared with the case of the above-described circuit of the first and second embodiments, the winding operation is alleviated, and the number of transistors used in the driving part can be reduced, thereby permitting a reduction in cost. Incidentally, the circuit of the third embodiment is suitable for the noncontact power transmission of relatively small power, and is effective in charging a secondary battery such as a PHS.

Figure 7:
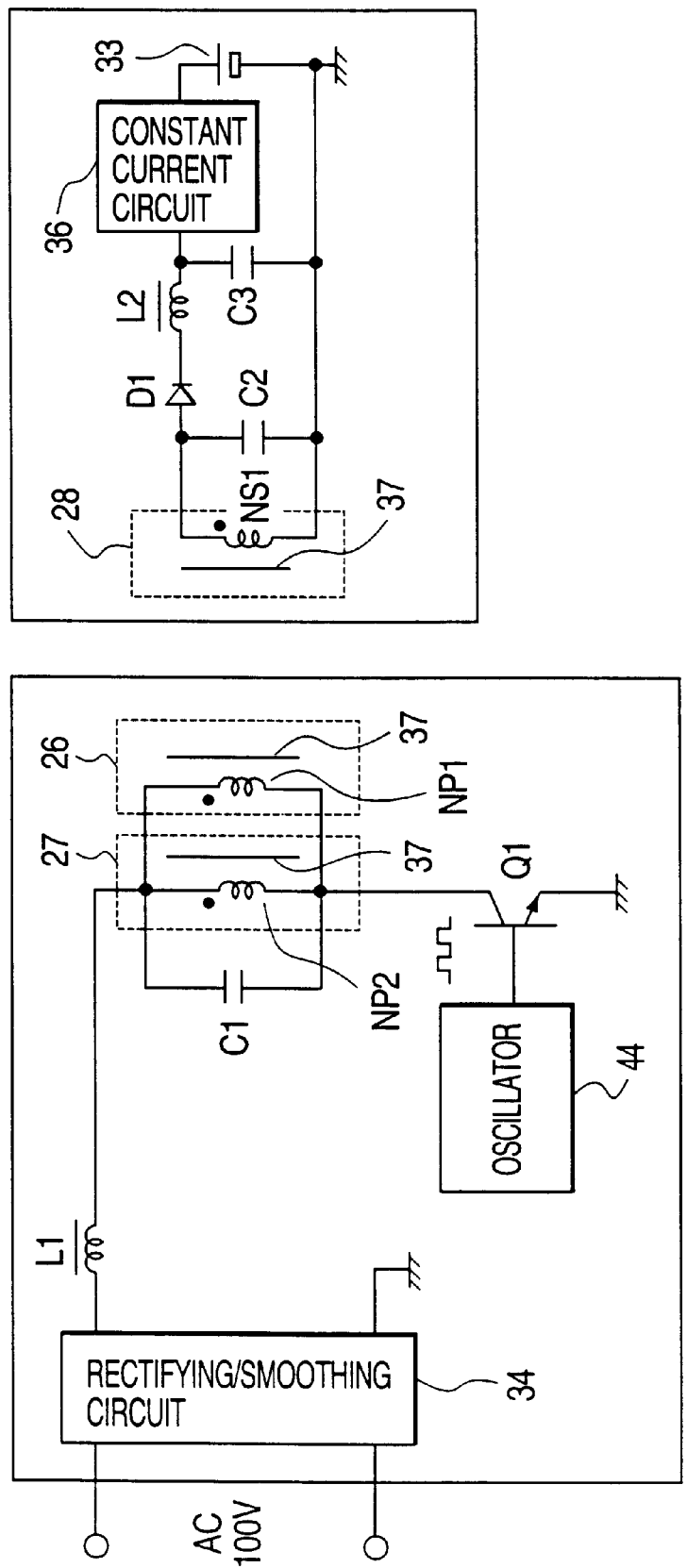
FIG. 7 is a diagram illustrating a circuit diagram in accordance with the fourth embodiment.

FIG. 7 shows a circuit according to fourth embodiment. Referring now to FIG. 7, a description will be given of the circuit of the fourth embodiment. The circuit of the fourth embodiment is an example in which the winding NP1 of the first power-transmitting coil portion 26 and the winding NP2 of the second power-transmitting coil portion 27 in the above-described circuit of the third embodiment are connected in parallel, and the other arrangements are similar to those of the circuit of the third embodiment.

As shown in FIG. 7, the charging part is provided with the rectifying and smoothing circuit 34, the choke coil L1 for a constant current, the transistor Q1 whose emitter is grounded, the oscillator 44 for driving the transistor Q1, the capacitor C1 for parallel resonance, the first power-transmitting coil portion 26, and the second power-transmitting coil portion 27. The first power-transmitting coil portion 26 is constituted by the ferrite core 37 and the first power-transmitting coil constituted by the winding NP1 which is wound around the ferrite core 37.

The second power-transmitting coil portion 27 is constituted by the ferrite core 37 and the second power-transmitting coil constituted by the winding NP2 which is wound around the ferrite core 37. In addition, the winding NP1 and the winding NP2 are connected in parallel, and their both ends are connected to the power source and the collector of the transistor Q1. Further, the windings NP1 and NP2 and the capacitor C1 are connected in parallel, and constitute a parallel resonance circuit.

In the charging part, high-frequency electromagnetic waves are generated as the first power-transmitting coil portion 26 and the second power-transmitting coil portion 27 are driven by the parallel resonance circuit and the high-frequency oscillating circuit of the separately excited type using the transistor Q1 which is driven by the oscillator 44, so as to effect the noncontact power transmission to the part to be charged by means of the electromagnetic waves.

Meanwhile, the part to be charged is provided with the power-receiving coil portion 28, the capacitor C2 for parallel resonance, the diode D1 for rectification, the choke coil L2, the capacitor C3 for smoothing, the constant-current circuit 36, and the Li-ion secondary battery 33. The power-receiving coil portion 28 is constituted by the ferrite core 37 and the winding NS1 which is wound around the ferrite core 37. In this case, the capacitor C2 is connected in parallel with the winding NS1, thereby constituting a parallel resonance circuit.

The operation of the circuit of the fourth embodiment is as follows. In the charging part, when power is supplied from the power source to the oscillator 44 to cause the oscillator 44 to start oscillating operation, and a drive signal is outputted from the oscillator 44 to the base of the transistor Q1, the transistor Q1 is driven on and off. Then, as the transistor Q1 is driven on and off, current flows across the parallel resonance circuit, and the parallel resonance circuit is set in a state of parallel resonance. In the charging part, the high-frequency oscillating circuit of the separately excited type thus effects the high-frequency oscillating operation. As the first power-transmitting coil portion 26 and the second power-transmitting coil portion 27 are driven, high-frequency electromagnetic waves are generated, so as to effect the noncontact power transmission to the part to be charged by means of the electromagnetic waves.

Meanwhile, the part to be charged operates as follows. As the charging part undergoes the high-frequency oscillating operation in the above-described manner, the transmission of power is effected by electromagnetic waves. At this time, by the action of electromagnetic induction, a voltage is induced in the winding NS1 of the power-receiving coil portion 28. As a result of this induced voltage, current flows across the parallel resonance circuit constituted by the winding NS1 and the capacitor C2, so that the parallel resonance circuit assumes the state of parallel resonance, expanding the amplitude of voltage.

Then, the output of the parallel resonance circuit is subjected to half-wave rectification by the diode D1, and the ripple current is reduced by the choke coil L2 and a smoothing circuit constituted by the capacitor C3, thereby generating a smooth dc voltage. Then, the constant-current circuit 36 is operated by the dc voltage to generate a constant current, and the Li-ion secondary battery 33 is charged by this constant current. As the noncontact power transmission is effected from the charging part to the part to be charged by the above-described operation, the Li-ion secondary battery 33 is charged.

Thus, in the circuit of the fourth embodiment, since the number of the windings of each of the coils of the first power-transmitting coil portion 26, the second power-transmitting coil portion 27, and the power-receiving coil portion 28 is small as compared with the case of the above-described circuit according to the first and second embodiments, the winding operation is alleviated, and the number of transistors used in the driving part can be reduced, thereby permitting a reduction in cost.

Figure 8A:
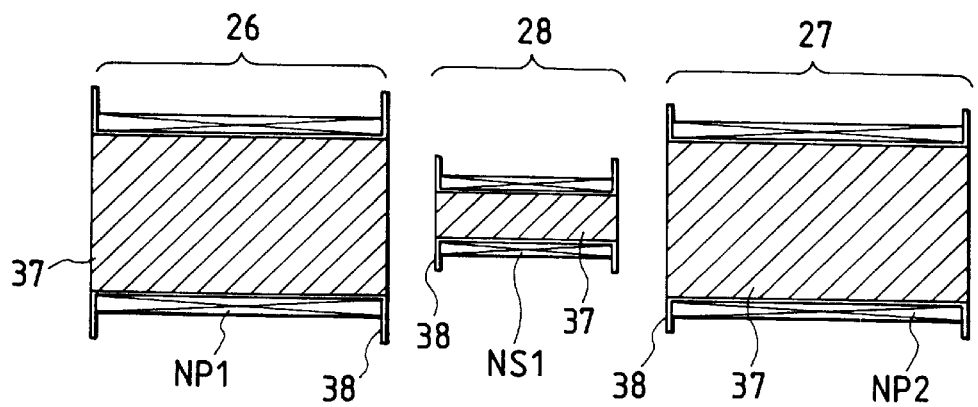
FIGS. 8A and 8C are explanatory diagrams of the power-transmitting coil portions and the power-receiving coil portion.
Figure 8B:
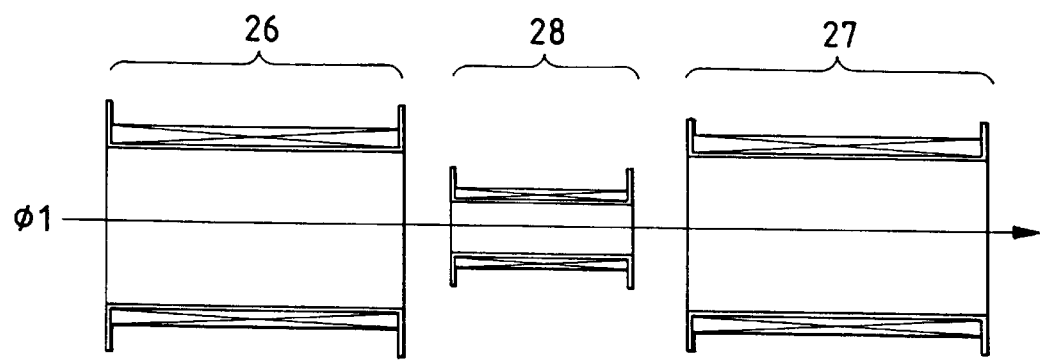
Figure 8C:
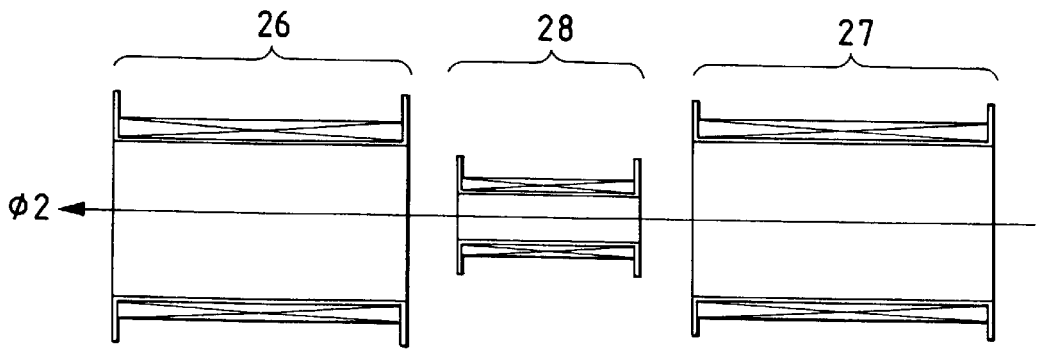

FIGS. 8A to 8C are explanatory diagrams of the power-transmitting coil portions and the power-receiving coil portion. FIG. 8A is an explanatory diagram of layout, and FIGS. 8B and 8C are explanatory diagrams of the magnetic flux. As described before, in the charging part in each of the circuit of the third and fourth embodiment, the power-transmitting coil is divided into two sets, and the power-transmitting coils of the sets are respectively wound around the ferrite cores 37, and are formed as the first power-transmitting coil portion 26 and second power-transmitting coil portion 27 which are separate and independent as the two sets. In addition, the power-receiving coil provided in the part to be charged is wound around the ferrite core 37, and is formed as the single power-receiving coil portion 28.

Then, in the chargeable state in which the part to be charged is placed on the charging part, the power-receiving coil portion 28 is inserted in the space between the first power-transmitting coil portion 26 and the second power-transmitting coil portion 27, and the first power-transmitting coil portion 26, the power-receiving coil portion 28, and the second power-transmitting coil portion 27 are arranged in such a manner as to be aligned with each other, as shown in FIG. 8A.

In addition, the power-transmitting coil of the first power-transmitting coil portion 26 is arranged such that the insulator base 38 is provided around the ferrite core 37, and the power-transmitting coil of the first power-transmitting coil portion 26 is constituted by one winding NP1 which is wound therearound. Meanwhile, the power-transmitting coil of the second power-transmitting coil portion 27 is arranged such that the insulator base 38 is provided around the ferrite core 37, and the power-transmitting coil of the second power-transmitting coil portion 27 is constituted by one winding NP2 which is wound therearound.

Further, the power-receiving coil of the power-receiving coil portion 28 is arranged such that the insulator base 38 is provided around the ferrite core 37, and the power-receiving coil of the power-receiving coil portion 28 is constituted by one winding NS1 which is wound therearound. As shown in FIGS. 8B and 8C, the respective windings of the above-described power-transmitting coils are wound such that the polarities of the windings NP1 and NP2 are adjusted so that the directions of ac magnetic fluxes $\phi 1$ and $\phi 2$, which penetrate from the first power-transmitting coil portion 26 and the second power-transmitting coil portion 27 through the power-receiving coil portion 28 with the Li-ion secondary battery 33 charged, are constantly set in the same direction.

For example, if the direction of the magnetic flux generated in the first coil portion 26 is the direction of $\phi 1$, the direction of the magnetic flux generated in the second power-transmitting coil portion 27 at this time is also the direction of $\phi 1$, and the direction of the magnetic flux generated in the power-receiving coil portion 28 is also the direction of $\phi 1$. On the other hand, if the direction of the magnetic flux generated in the first coil portion 26 is the direction of $\phi 2$ (an opposite direction to $\phi 1$), the direction of the magnetic flux generated in the second power-transmitting coil portion 27 at this time is also the direction of $\phi 2$, and the direction of the magnetic flux generated in the power-receiving coil portion 28 is also the direction of $\phi 2$.

Figure 9A:
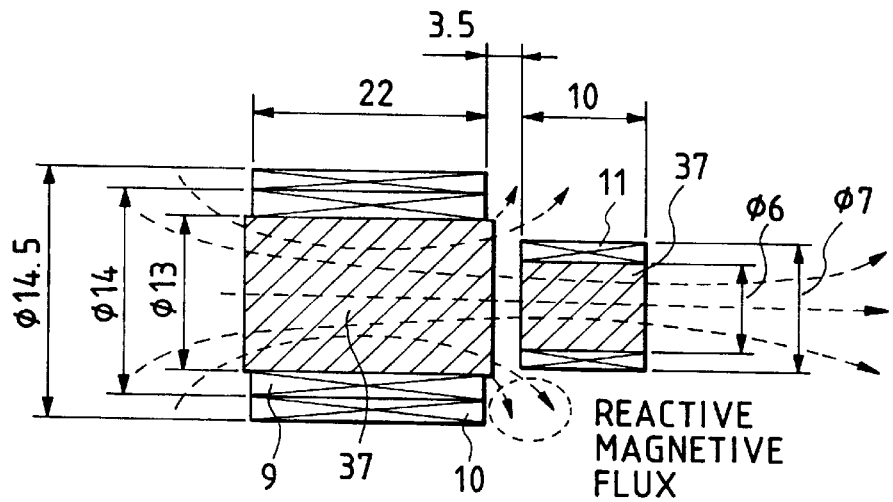
FIGS. 9A and 9B are explanatory diagrams of an experiment in accordance with the present invention.
Figure 9B:
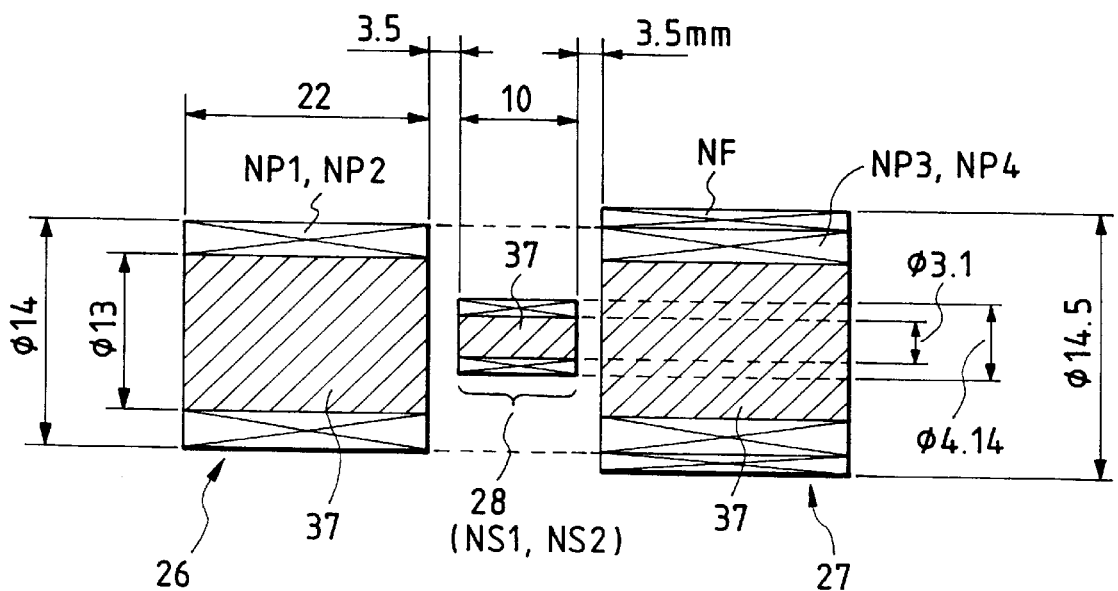
Figure 10:
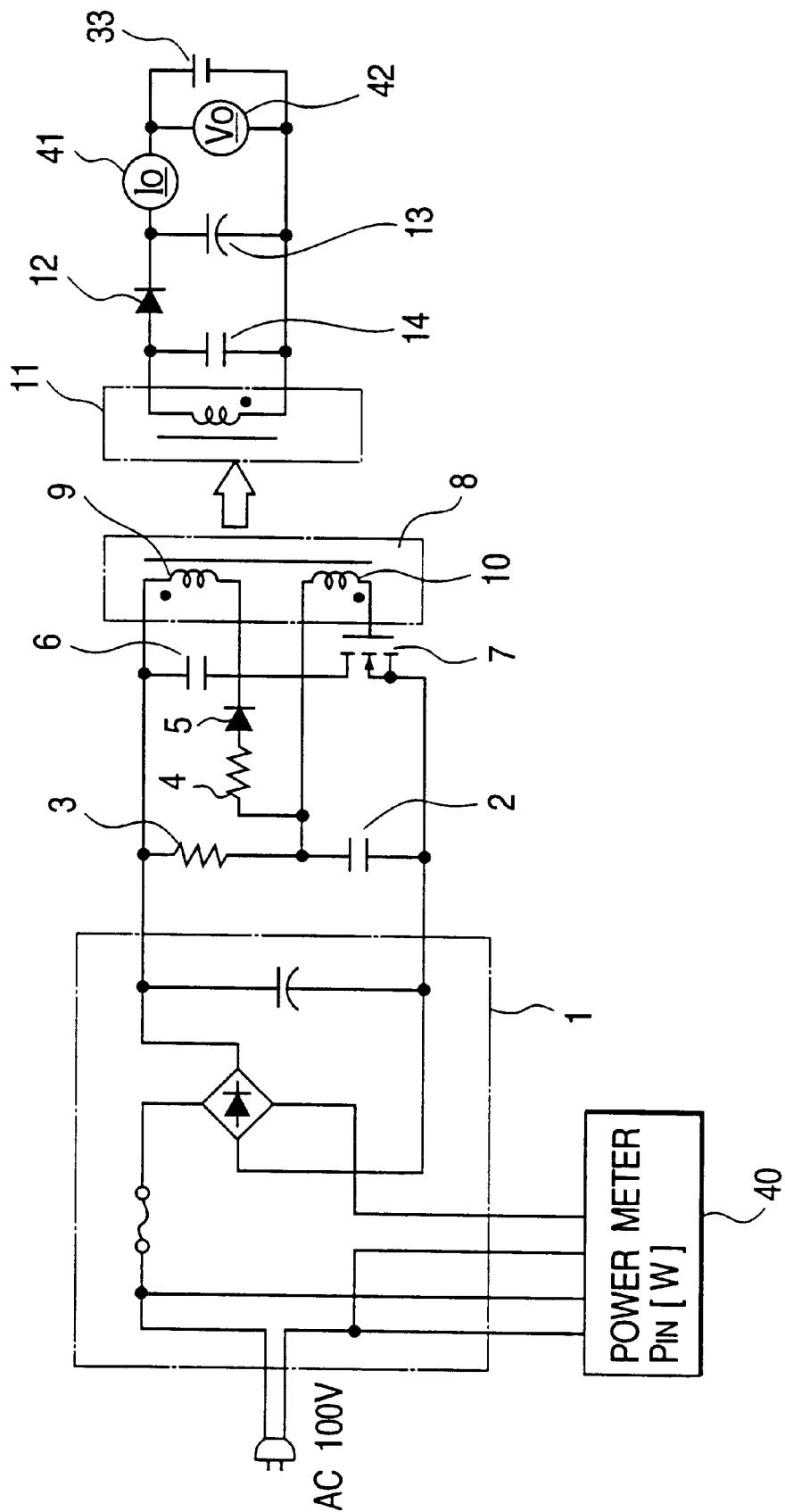
FIG. 10 is an explanatory diagram of an experiment for conventional circuit configuration.
Figure 11:
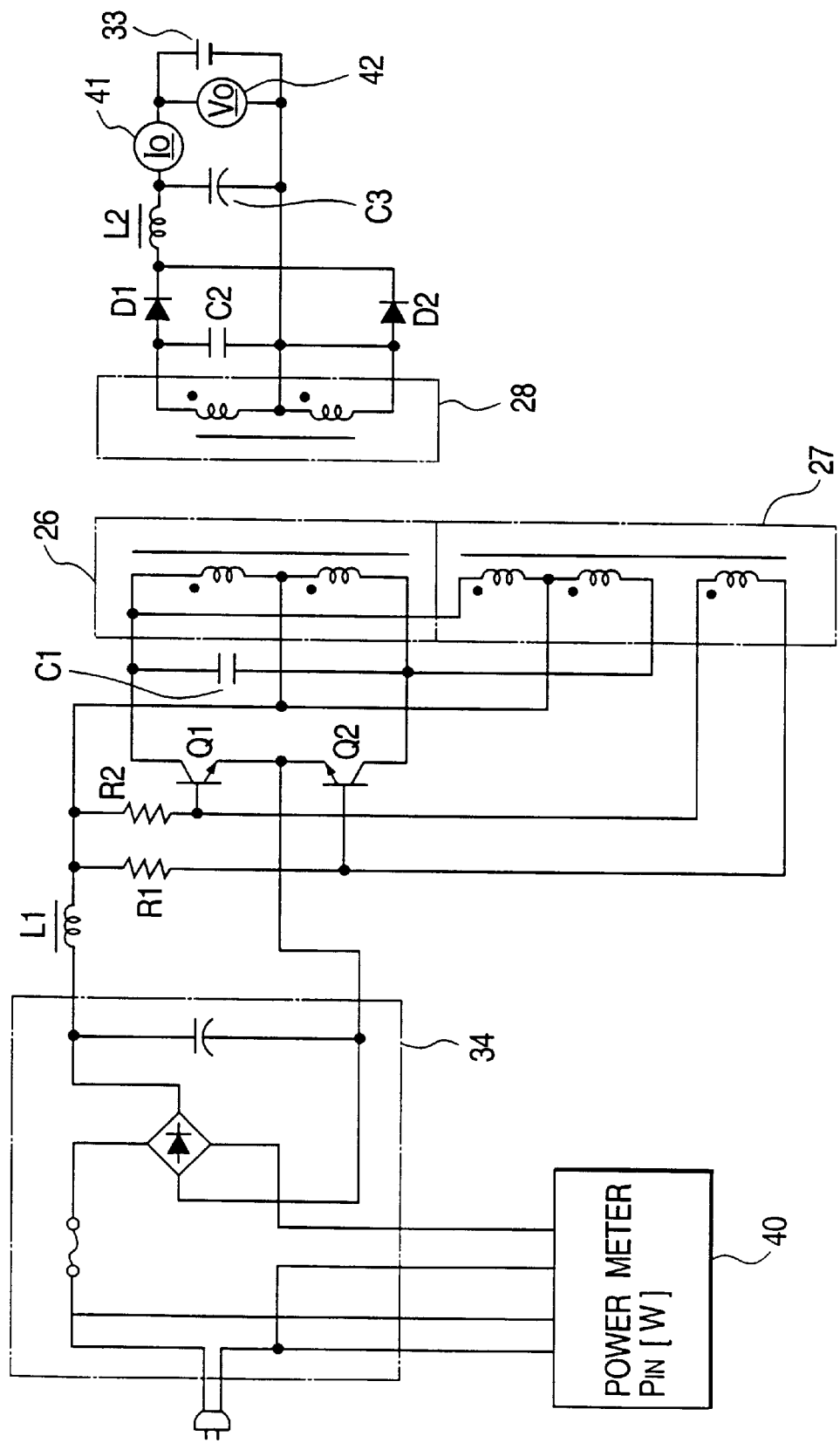
FIG. 11 is an explanatory diagram of an experiment for the circuit configuration of the present invention.

FIGS. 9A and 9B are explanatory diagrams of an experiment. FIG. 9A is a diagram illustrating the coil portions of a conventional device, and FIG. 9B is a diagram illustrating the coil portions in accordance with the present invention. FIG. 10 shows an experimental circuit of the conventional device. FIG. 11 shows an experimental circuit in accordance with the present invention. Since the experiment was conducted to confirm the effects of the present invention, and its results will be described hereafter. Incidentally, since an experiment was conducted with respect to the conventional device as well for comparison's sake, its results will also be described.

In this experiment, an experiment was conducted by using the coil portions shown in FIGS. 9A and 9B and using the experimental circuits shown in FIGS. 10 and 11. In this case, since the power-receiving coil portion 28 is incorporated in the portable telephone body or the like, its volume and weight present problems. For this reason, the shapes of the power-transmitting coil portion and the power-receiving coil portion were made identical in the conventional device and the present invention, output power (charging current x terminal voltage at the Li-ion secondary battery 33) was set under the same condition (output power:constant), and an experiment was conducted with an important check item being to what extent the power-receiving coil portion 28 can be made compact and lightweight.

Figure 12B:
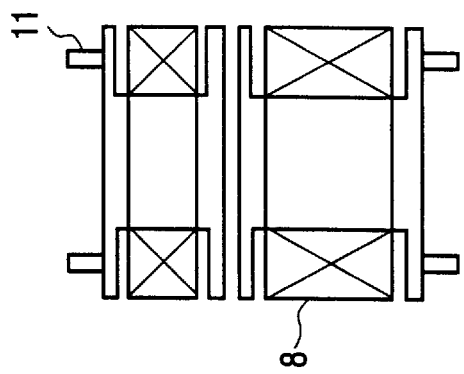
FIGS. 12A to 12C are explanatory diagrams of a conventional device.
Figure 12A:
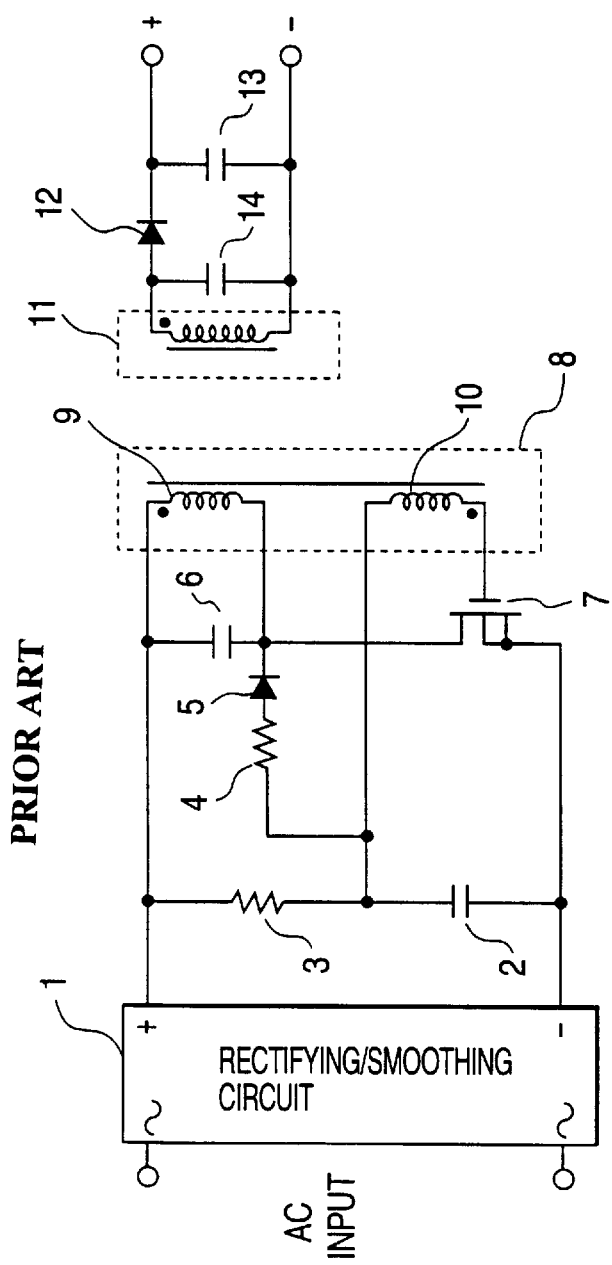
Figure 12C:
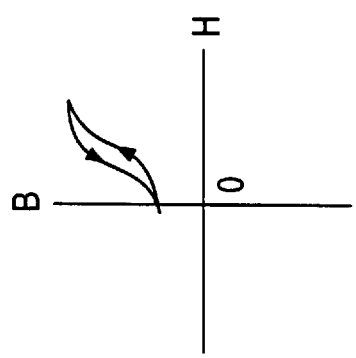

As the coil portions of the conventional device, the coil portions of the conventional device shown in FIG. 12 were used, and the coil portions in which coils were wound around the ferrite core 37 were used. Namely, the main winding 9 and the gate winding 10 of the primary transformer 8 were wound around the columnar ferrite core 37 subjected to insulation treatment, so as to form the power-transmitting coil portion, and the winding of the secondary transformer 11 was wound around the columnar ferrite core 37 subjected to insulation treatment, so as to form the power-receiving coil portion.

Then, the dimensions of the power-transmitting coil portion were set as shown in the drawing (all the units being millimeters), the power-transmitting coil portion and the power-receiving coil portion were aligned coaxially, and the gap between the coil portions was set at 3.5 mm. In this case, the outer appearance of the power-receiving coil portion was columnar, and its outside dimensions were 10 mm in length (or height) and 7 mm in diameter.

As for the coil portions of the present invention, the first power-transmitting coil portion 26, the power-receiving coil portion 28, and the second power-transmitting coil portion 27 were aligned coaxially, and the respective gaps between the adjacent ones of the coil portions were set at 3.5 mm. Then, the dimensions of the first power-transmitting coil portion 26, the power-receiving coil portion 28, and the second power-transmitting coil portion 27 were set as shown in the drawing (all the units being millimeters). In this case, the outer appearance of the power-receiving coil portion was columnar, and its outside dimensions were 10 mm in length (or height) and 3.1 mm in diameter.

The circuit shown in FIG. 10 was used as the experimental circuit of the conventional device. This circuit was the circuit of the conventional example, shown in FIG. 12, in which a wattmeter 40 was connected to the input side of the charging part, while an ammeter 41 and a voltmeter 42 were connected to the output side of the part to be charged (the input side of the Li-ion secondary battery 33).

An ac input of 50 Hz and AC 100 V was used as the input to this circuit, the input power $P_{IN}$ (W) was measured by the wattmeter 40, and the output current (charging current for the Li-ion secondary battery 33) $I_O$ and the output voltage (terminal voltage at the Li-ion secondary battery 33) $V_O$ were measured by the ammeter 41 and the voltmeter 42. Then, the output power $P_{OUT}$ ($P_{OUT}=I_O \times V_O$) was determined from the current value $I_O$ measured by the ammeter 41 and the voltage value $V_O$ measured by the voltmeter 42, and the conditions were set such that this value became identical.

The circuit shown in FIG. 11 was used as the experimental circuit of the present invention. This circuit was the circuit of the embodiment shown in FIG. 3, in which the wattmeter 40 was connected to the input side of the charging part, while the ammeter 41 and the voltmeter 42 were connected to the output side of the part to be charged (the input side of the Li-ion secondary battery 33).

An ac input of 50 Hz and AC 100 V was used as the input to this circuit, the input power $P_{IN}$ (W) was measured by the wattmeter 40, and the output current $I_O$ and the output voltage $V_O$ were measured by the ammeter 41 and the voltmeter 42. Then, the output power $P_{OUT}$ ($P_{OUT}=I_O \times V_O$) was determined from the current value $I_O$ measured by the ammeter 41 and the voltage value $V_O$ measured by the voltmeter 42, and the conditions were set such that this value became identical.

The results of experiment conducted under the aforementioned experimental conditions are shown in Table 1.

TABLE 1

| | Input Power $P_{IN}$ (W) | Output Voltage $V_O$ (V) | Output Current $I_O$ (mA) | Weight (g) | Volume (mm$^3$) |
| --- | --- | --- | --- | --- | --- |
| Conventional Example | 5.01 | 4.2 | 800 | 1.24 | 384.7 |
| Present Invention | 4.80 | 4.2 | 800 | 0.33 | 134.6 |

As shown in Table 1 above, in both circuits of the conventional example and the present invention, the output voltage $V_O$ was set at 4.2 V, and the output current $I_O$ was set at 800 mA, such that the output power $P_{OUT}=I_O \times V_O = 800 \times 10^{-3} \times 4.2 = 3.36$ (W), and was set as constant. When the output power was set under the same condition, and the input power $P_{IN}$ at that time was measured, $P_{IN}$ in the conventional example was 5.01 W, and $P_{IN}$ in the present invention was 4.8 W.

In addition, the volume (mm$^3$) and the weight (g) were calculated from the dimensions of the coil portions, and the results are shown in Table 1. In this case, the weight was the weight of the ferrite core 37 of the power-receiving coil portion 28 (the weight of the power receiving coil was handled as being substantially the same), and the volume was that of the entire power-receiving coil portion 28. In the calculation of the weight, the calculation was made by assuming that the specific gravity of the ferrite core 37 was 4.4 (g/cm$^3$).

As a result, the weight in the conventional example was $\pi \{(6/2) \times 10^{-1}\}^2 \times 10 \times 10^{-1} \times 4.4 = 1.24$ (g), and the weight in the present invention was $\pi \times \{(3.1/2) \times 10-1\}^2 \times 10 \times 10^{-1} \times 4.4 = 0.33$ (g).

Accordingly, if it is assumed that the weight in the conventional example is WT1 and that the weight in the present invention is WT2, and if a ratio between them is calculated, we have WT2/WT1=0.27. Thus, the weight of the power-receiving coil portion 28 in accordance with the present invention becomes approximately 0.27 time that of the conventional example. Hence, it was possible to substantiate that the power-receiving coil portion 28 in accordance with the present invention can be made lightweight.

In addition, if it is assumed that the volume in the conventional example is VOL1 and that the volume in the present invention is VOL2, then VOL1 and VOL2 are calculated as VOL1=$\pi \times (7/2)^2 \times 10 = 384.7$ mm$^3$, and VOL2= $\pi \times (4.14/2)^2 \times 10 = 134.6$ mm$^3$. If a ratio between them is calculated, we have VOL1/VOL2=134.6/384.7=0.35. Thus, the volume of the power-receiving coil portion 28 in accordance with the present invention becomes approximately 0.3 time that of the conventional example. Hence, it was possible to substantiate that the power-receiving coil portion 28 in accordance with the present invention can be made compact.

It should be noted that, in the above-described circuit according to the first and second embodiments, since the high-frequency oscillating circuit of the push-pull type is used in the charging part to enable the noncontact power transmission of large power, the circuit of the first and second embodiments are effective for apparatuses requiring large power (3 to 5 W) as in the case of portable telephones. In contrast, in the circuit according to the third and fourth embodiments, since the number of windings and the number of drive transistors are small, the circuit of the third and fourth embodiments are suitable for the noncontact power transmission of relatively small power (1 to 1.5 W) as in the case of PHS's. Thus, since the circuit examples 1 and 2 are suitable for apparatuses requiring relatively large power, and the circuit of the third and fourth embodiments are suitable for apparatuses requiring relatively small power, these circuit examples can be selectively used depending on the usage.

Although a description has been given of the embodiment, the present invention can be also implemented if the following arrangements are adopted.

Although the high-frequency oscillating circuit in the above-described circuit of the first and second embodiments may be the high-frequency oscillating circuit of the push-pull type using two transistors, the high-frequency oscillating circuit is not limited to such an example, and may be implemented by using a single transistor. In addition, the high-frequency oscillating circuit in the circuit of the first and second embodiments is not confined to the high-frequency oscillating circuit of the self-excited type, but can be also implemented in a similar manner by the high-frequency oscillating circuit of the separately excited type.

The part to be charged is not confined to the portable telephone body (handset), but is also applicable to other similar apparatuses.

The secondary battery is not confined to the Li-ion secondary battery, but other arbitrary secondary batteries may also be used.

In the above-described circuit of the first to fourth embodiments, the power-transmitting coil of the first power-transmitting coil portion, the power-transmitting coil of the second power-transmitting coil portion, and the power-receiving coil of the power-receiving coil portion are arranged such that the insulator bases 38 are respectively provided around the ferrite cores 37, and these coils are constituted by windings which are wound therearound. However, all the windings may be implemented without using the ferrite cores 37 and the insulator bases 38, and may be formed as air-core coils.

In the above-described circuit of the first to fourth embodiments, the power-transmitting coil of the first power-transmitting coil portion, the power-transmitting coil of the second power-transmitting coil portion, and the power-receiving coil of the power-receiving coil portion are arranged such that the insulator bases 38 are respectively provided around the ferrite cores 37, and these coils are constituted by windings which are wound therearound. However, coil bobbins may be used instead of the insulator bases 38.

The high-frequency oscillating circuit in the above-described circuit examples 3 and 4 is not confined to the high-frequency oscillating circuit of the separately excited type, but can be also implemented in a similar manner by the high-frequency oscillating circuit of the self-excited type.

As described above, in accordance with the present invention, the following advantages are obtained.

In the noncontact power transmitting apparatus which comprises the charging part and the part to be charged, it is possible to rapidly charge a secondary battery to be charged in the part to be charged with large electric power, and it is possible to realize a lightweight and compact part to be charged.

In particular, with the conventional apparatuses, there has been a drawback in that in a case where large power (e.g., 5 W or more) for rapidly charging a secondary battery of large capacity, such as the Li-ion secondary battery, is fetched from the power-receiving coil, the power-receiving coil becomes large-sized, and the weight becomes heavy. In accordance with the invention of this application, however, such a drawback can be overcome.

The power-transmitting coil is divided into two sets, and the power-transmitting coils of the sets are formed as the first power-transmitting coil portion and the second power-transmitting coil portion which are separate and independent as the two sets. In addition, the power-receiving coil is formed as a single power-receiving coil portion. In a chargeable state in which the part to be charged is placed on the charging part, the power-receiving coil portion is inserted in the space between the first power-transmitting coil portion and the second power-transmitting coil portion, and the first power-transmitting coil portion, the power-receiving coil portion, and the second power-transmitting coil portion are arranged in such a manner as to be aligned with each other.

Accordingly, since the efficiency in the noncontact power transmission from the charging part to the part to be charged improves, it is possible to realize a lightweight and compact part to be charged, and rapidly charge the secondary battery with large power.

In a charging state in which the part to be charged is placed on the charging part, the power-receiving coil portion is inserted in the space between the first power-transmitting coil portion and the second power-transmitting coil portion, and the power-transmitting coil portion, the power-receiving coil portion, and the second power-transmitting coil portion are aligned with each other. In a case where the secondary battery is charged, the windings of the first and second power-transmitting coil portions are driven by the driving means, and the change in the magnetic flux of the ferrite core is subjected to large oscillations in the first and third quadrants of the B-H loop, thereby making it possible to realize the noncontact power transmission with high efficiency. Therefore, it is possible to realize a lightweight and compact part to be charged, and rapidly charge the secondary battery with large power.

The power-transmitting coils of the first power-transmitting coil portion and the second power-transmitting coil portion are respectively provided with two windings wound around the cores, and the power-transmitting coils are connected in series or in parallel. At the same time, the respective windings of the power-transmitting coils are wound such that the polarities of the windings are adjusted so that the directions of magnetic fluxes, which penetrate from the first power-transmitting coil portion and the second power-transmitting coil portion through the power-receiving coil portion, are constantly set in the same direction.

For this reason, when the secondary battery is charged, the change in the magnetic flux of the ferrite core is subjected to large oscillations in the first and third quadrants of the B-H loop, thereby making it possible to realize the noncontact power transmission with high efficiency. Therefore, it is possible to realize a lightweight and compact part to be charged, and rapidly charge the secondary battery with large power.

The power-transmitting coil of the first power-transmitting coil portion and the power-transmitting coil of the second power-transmitting coil portion are connected in series or in parallel, and respectively consist of one winding portions. At the same time, the respective winding portions of the power-transmitting coils are wound such that the polarities of the winding portions are adjusted so that the directions of magnetic fluxes, which penetrate from the first power-transmitting coil portion and the second power-transmitting coil portion through the power-receiving coil portion, are constantly set in the same direction.

If such an arrangement is adopted, the number of winding portions can be reduced, the operation of winding the coils is alleviated, and the number of transistors used in the driving part can be reduced. In addition, the noncontact power transmitting apparatus of the above-described type is optimally suited as an apparatus requiring small power (e.g., a PHS), and a reduction in the cost of the apparatus becomes possible. For example, in a case where the noncontact power transmitting apparatus in accordance with the invention of this application is applied to a portable telephone, the power-receiving coil portion is incorporated on the portable telephone body side, while the power-transmitting coil portions are incorporated on the charger side. Accordingly, if the lightweight and compact power-receiving coil portion can be realized as described above, the portable telephone body (handset), which needs to be always carried by the user, is made lightweight and compact, and can therefore be carried conveniently.

What is claimed is:

1. A noncontact power transmitting apparatus comprising:
a transmitting part including a high-frequency oscillating circuit having a parallel resonance circuit formed by a capacitor and a power-transmitting coil, said power-transmitting coil including a first power-transmitting coil portion and a second power-transmitting coil portion; and a receiving part including a power-receiving coil portion for inducing a voltage by electromagnetically coupling with said power-transmitting coil of said high-frequency oscillating circuit;

in a power transmitting state in that said receiving part is magnetically coupled with the charging part, the power-receiving coil portion is inserted in a space between the first power-transmitting coil portion and the second power-transmitting coil portion, and the first power-transmitting coil portion, the power-receiving coil portion, and the second power-transmitting coil portion are arranged in such a manner that the power-receiving coil portion is located in the magnetic flux generated by the first and second power-transmitting coil portions.

2. A noncontact power transmitting apparatus as claimed in claim 1, wherein said first and second power-transmitting coil portions are respectively wound around cores, and said power-receiving coil portion is wound around a core.

3. A noncontact power transmitting apparatus as claimed in claim 1, wherein said first power-transmitting coil portion and said second power-transmitting coil portion are connected in one of series and parallel, and each of said first and second power-transmitting coil portions consists of two winding portions, said winding portions being wound such that polarities of the winding portions are adjusted so that directions of magnetic fluxes, which penetrate from the first power-transmitting coil portion and the second power-transmitting coil portion through the power-receiving coil portion, are constantly set in the same direction.

4. A noncontact power transmitting apparatus as claimed in claim 2, wherein said first power-transmitting coil portion and said second power-transmitting coil portion are connected in one of series and parallel, and each of said first and second power-transmitting coil portions consists of two winding portions, said winding portions being wound such that polarities of the winding portions are adjusted so that directions of magnetic fluxes, which penetrate from the first power-transmitting coil portion and the second power-transmitting coil portion through the power-receiving coil portion, are constantly set in the same direction.

5. A noncontact power transmitting apparatus as claimed in claim 3, wherein said high-frequency oscillating circuit comprises driving means for driving winding portions of the first power-transmitting coil portion and the second power-transmitting coil portion while alternately repeating a first timing at which one winding portion of the first power-transmitting coil portion and one winding portion of the second power-transmitting coil portion are energized simultaneously and other winding portions are not energized and a second timing at which another winding portion of the first power-transmitting coil portion and another winding portion of the second power-transmitting coil portion are energized simultaneously and the one winding portions are not energized.

6. A noncontact power transmitting apparatus as claimed in claim 4, wherein said high-frequency oscillating circuit comprises driving means for driving winding portions of the first power-transmitting coil portion and the second power-transmitting coil portion while alternately repeating a first timing at which one winding portion of the first power-transmitting coil portion and one winding portion of the second power-transmitting coil portion are energized simultaneously and other winding portions are not energized and a second timing at which another winding portion of the first power-transmitting coil portion and another winding portion of the second power-transmitting coil portion are energized simultaneously and the one winding portions are not energized.

7. A noncontact power transmitting apparatus as claimed in claim 1, wherein said first power-transmitting coil portion and said second power-transmitting coil portion are connected in one of series and parallel, and each of said first power-transmitting coil portion and second power-transmitting coil portion consist of one winding portion, and the winding portion being wound such that polarities of the winding portions are adjusted so that directions of magnetic fluxes, which penetrate from the first power-transmitting coil portion and the second power-transmitting coil portion through the power-receiving coil portion, are constantly set in the same direction.

8. A noncontact power transmitting apparatus as claimed in claim 2, wherein said first power-transmitting coil portion and said second power-transmitting coil portion are connected in one of series and parallel, and each of said first power-transmitting coil portion and second power-transmitting coil portion consist of one winding portion, and the winding portion being wound such that polarities of the winding portions are adjusted so that directions of magnetic fluxes, which penetrate from the first power-transmitting coil portion and the second power-transmitting coil portion through the power-receiving coil portion, are constantly set in the same direction.

9. A noncontact power transmitting apparatus as claimed in claim 1, wherein said transmitting part is a battery charger and said receiving part is a portable electronic apparatuses including a rechargeable battery.

10. A noncontact power transmitting apparatus as claimed in claim 2, wherein said transmitting part is a battery charger and said receiving part is a portable electronic apparatuses including a rechargeable battery.

\* \* \* \* \*